Aug. 30, 1966   A. B. CANFIELD   3,269,524
BAG CLAMP
Filed Oct. 24, 1963   2 Sheets-Sheet 1
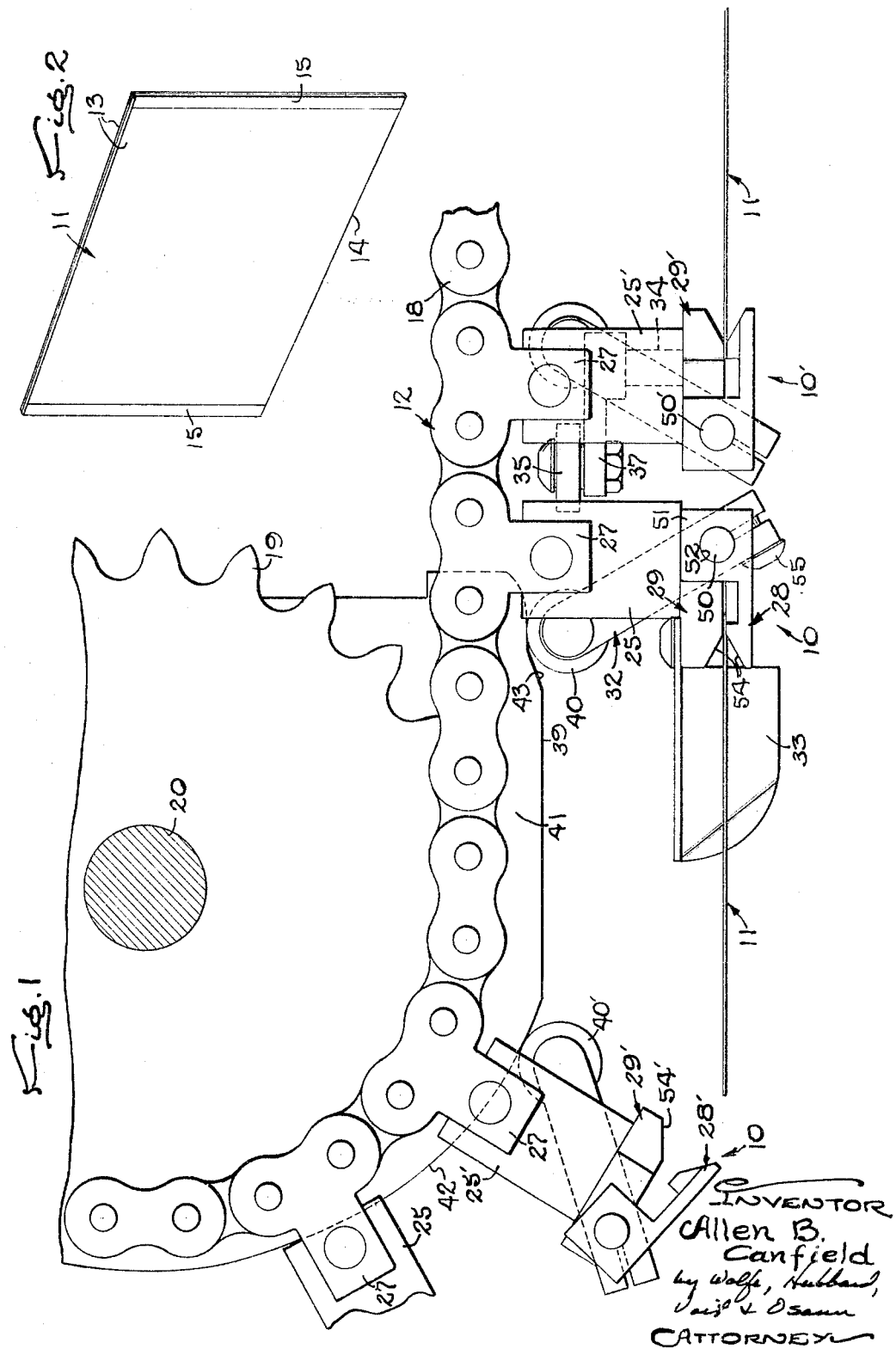
INVENTOR
Allen B. Canfield
by Wolfe, Hubbard,
Voit & Osann
ATTORNEYS Aug. 30, 1966
A. B. CANFIELD
3,269,524
BAG CLAMP
Filed Oct. 24, 1963
2 Sheets-Sheet 2
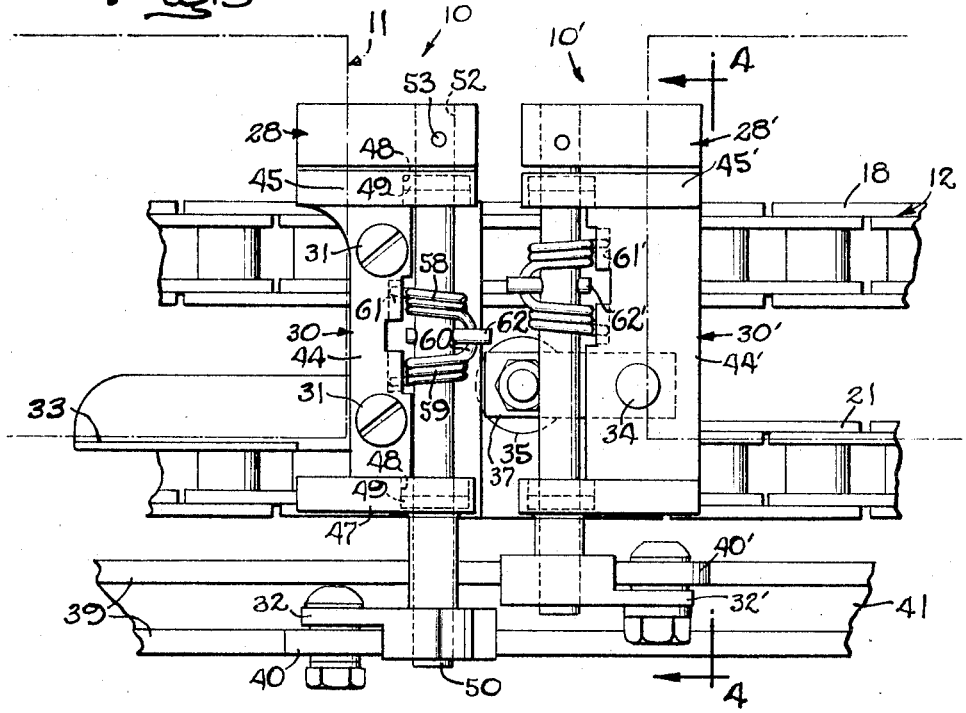
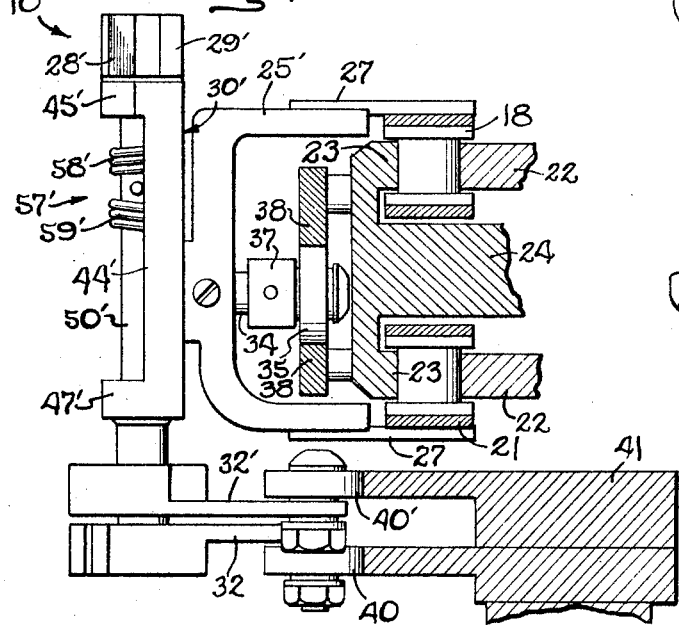
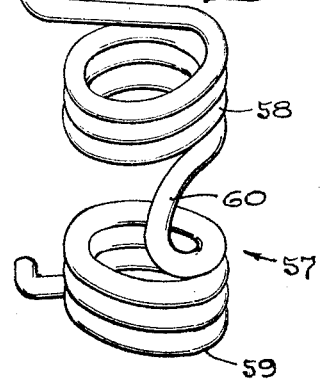
INVENTOR
Allen B. Canfield
by Wolfe, Hubbard, * & *
ATTORNEYS

1

3,269,524
BAG CLAMP
Allen B. Canfield, Rockford, Ill., assignor to Bartelt Engineering Company, Inc., Rockford, Ill., a corporation of Delaware
Filed Oct. 24, 1963, Ser. No. 318,623
3 Claims. (Cl. 198—180)

This invention relates to clamps for gripping and holding bags and the like on a conveyor on a packaging machine and, more particularly to a clamp including two relatively movable jaws and an operator controlled by a cam on the machine frame for closing and opening the jaws at selected points along the conveyor first to grip a bag and carry it along the conveyor and then to release the bag from the conveyor.

The general object of the present invention is to provide a novel clamp of the foregoing character in which the clamping point of each individual clamp may be more precisely controlled and timed relative to the movement of the clamp along the conveyor than has been possible with prior clamps of the same general type and which, at the same time, is sturdy and relatively simple in construction and positive and trouble-free in operation.

A more detailed object is to pivot the movable jaw of the clamp on the conveyor for swinging toward and away from the fixed jaw about a predetermined axis to open and close the clamp, mount the operator in a preselected fixed angular relation with the movable jaw, and urge the clamp closed in a novel manner such that the clamp is immediately responsive to movements of the operator.

Another object is to mount the operator for precise and minute adjustments relative to the movable clamp jaw to permit exact control of the clamping point of each individual clamp on the conveyor.

The invention also resides in the novel spring construction for urging the clamp closed.

Other objects and advantages of the invention will become apparent from the following detailed description taken in connection with the accompanying drawings, in which FIGURE 1 is a fragmentary view of part of a packaging machine including a conveyor provided with clamps embodying the novel features of the present invention, the view being taken in a horizontal plane above the conveyor.

FIG. 2 is a perspective view of a bag adapted to be gripped by the clamps in FIG. 1.

FIG. 3 is a fragmentary side elevational view of the mechanism shown in FIG. 1.

FIG. 4 is a fragmentary cross-sectional view taken along the line 4—4 of FIG. 3.

FIG. 5 is an enlarged perspective view of the clamp spring.

As shown in the drawings for purposes of illustration, the invention is embodied in a clamp 10 particularly well suited for use in holding pouches or bags 11 on the conveyor 12 of a continuous motion packaging machine for forming, filling and closing such bags. The illustrative bag shown in FIG. 2 comprises two panels 13 of flexible heat-sealable material such as polyethylene film disposed in opposed face-to-face relation and joined together along their lower margins by a fold 14, the two side margins being sealed together at 15 to form an open-ended bag. After a charge of material has been introduced into the bag, the bag top is closed by a heat seal (not shown) similar to the side seals.

Such bags are produced by advancing a continuous, longitudinally folded web of material endwise through the machine, cross-sealing the web along longitudinally spaced transverse lines to form a series of pockets, and severing the web along each cross-seal to form separated bags. Upon severance of bags from the web, they are transferred one by one to spaced clamps 10 on the conveyor 12 and, as an incident to this transfer, are spaced apart from the edge-to-edge relation in which they are disposed when separated in order to permit more accurate and neater filling and closing operations.

To increase the spacing of the bags, the conveyor 12 is driven at a faster speed than the rate of travel of the web and each bag is accelerated as it is transferred from the web to the conveyor, momentarily moving at a velocity faster than the conveyor to overtake a clamp 10 on the conveyor. For example, the linear speed of the web may be about 16 inches per second while the conveyor travels at a speed of approximately 22 inches per second. Accordingly, the bags are accelerated from 16 inches per second to a velocity substantially greater than 22 inches per second. The mechanism for forming and accelerating the bags forms no part of the present invention and therefore is not shown herein.

As shown in FIGS. 1, 3 and 4, the conveyor 12 comprises an endless chain 18 disposed in a horizontal plane with a straight run extending from a point adjacent the accelerator toward the filling and closing stations of the machine. At the forward end of the conveyor, the chain is trained around a sprocket wheel 19 fast on a vertical shaft 20 for driving the chain. For the sake of rigidity, a second chain 21 (FIGS. 3 and 4) is disposed beneath the chain 18 and is trained around another, similar sprocket wheel on the shaft 20. Two additional sprocket wheels (not shown) support the chains at the rear end of the conveyor. For further rigidity, the two chains are positively guided in tracks formed between two vertically spaced bars 22 (FIG. 4) engaging the inner sides of the chain rollers and two inturned flanges 23 on a rail 24 engaging the outer sides of the rollers.

Spanning the two chains 18 and 21 at equally spaced points along the conveyor 12 are a plurality of supports in the form of U-shaped mounting brackets 25 each secured at its opposite ends to two vertically alined lugs 27 projecting horizontally outwardly from the respective chains. The clamps 10 are mounted on these brackets to open rearwardly, to the left in FIG. 1, and comprise generally a pair of opposed, relatively movable clamping jaws 28 and 29 mounted on a carrier 30 supported on the associated bracket 25 by two screws 31 (FIG. 3). An operator 32 is provided on each carrier for opening the clamp to receive the leading edge portion of a bag 11 at the forward end of the conveyor, closing the clamp to grip the bag, and opening the clamp to release the bag adjacent the rear end of the conveyor. A flanged platform 33 projects rearwardly from each clamp to lie beneath the lower edge of each bag and lend momentary support to the bag as the clamp is closed.

Preferably, a second set of bag clamps 10′ is provided to grip the trailing edges of the bag 11, one of these clamps being spaced behind each clamp 10 a distance corresponding to the bag width and opening forwardly to receive and grip the trailing edge of the preceding bag. When the bag is gripped securely by both clamps, the trailing clamp is rocked forward, clockwise in FIG. 3, to move the side edges of the bag together at the top of the bag and bow the two panels 13 away from each other preparatory to the filling operation. For this purpose, the carrier 30′ of each clamp 10′ is pivotally mounted on its bracket 25′ by a horizontal pin 34 journaled fast on the carrier and journaled in the associated bracket, and the angular position of the carrier relative to the bracket is controlled by a follower roller 35 journaled on the free end of an arm 37 fixed at its other end to the pin and rocked up and down in a vertical plane by a pair of cams 38 (FIG. 4) on the frame. In all other important respects, the clamps 10 and 10′ are substantially identical and corresponding parts are indicated herein by corresponding primed reference numbers.

It will be evident that the timing of the closing of the clamps 10 must be carefully controlled in machines in which the free bags 11 are transferred with a continuous motion and at high speed to a conveyor moving at a speed different from the speed of the web, particularly where the transfer is effected at a momentary velocity substantially greater than the velocity of the conveyor. Control of the clamps customarily is accomplished by means of a fixed cam track 39 (FIG. 1) on the machine frame and cooperating with a follower 40 on the operator 32 to move the movable clamp jaw 28 in accordance with the position of the clamp along the conveyor.

As shown in FIG. 1, the cam track 39 is formed on the outer surface of a bar 41 fast on the machine frame and having an arcuate portion 42 curving eccentrically outwardly relative to the curvature of the sprocket wheel 19 to open each clamp as it passes around the sprocket and enters the straight run of the chains 18, 21. A fall surface 43 on the cam permits the clamp to close on the leading edge portion of the bag. This surface is positioned to begin closing the clamp just before the bag is delivered, and to complete the closing just after the bag edge passes between the jaws. If the clamp closes an instant too soon, the bag will be blocked against entering between the jaws. If, on the other hand, the clamp closes an instant too late, the bag may fall away from the clamp before it is gripped. With this in mind, it will be obvious that precise control of the clamping point of each clamp 10 is essential for optimum performance of the machine.

In prior machines of this type that have found commercial acceptance, the best solution to this problem has been the use of clamps with movable jaws formed by flexible spring plates stressed to urge the plate against the fixed jaw and cammed back and forth by the operator. Experience has shown, however, that precise control of the clamping point of each individual clamp is not practically obtainable with such clamps.

Accordingly, the present invention contemplates the provision of an improved clamp 10 in which the clamping point of each individual clamp may be controlled and timed precisely to insure that the clamp closes on the bag 11 at exactly the right instant. To this end, the movable clamp jaw 28 is pivoted on the carrier 30 for swinging toward and away from the fixed jaw 29 about a predetermined axis, and the operator 32 is rigid with the movable jaw and disposed in a preselected angular relation with the latter so that the clamp is immediately and completely responsive to movements of the operator. Moreover, the clamp is urged closed and the operator is urged against the cam track 39 in a manner which materially enhances the positive action and responsiveness of the clamp.

In this instance, the carrier 30 is formed by a relatively narrow vertical bar 44 fastened to the bracket 25 by the screws 31 with the fixed jaw 29 projecting upwardly and offset to the left (FIG. 3) from the bar. Projecting horizontally to the right from the upper and lower ends of the bar are two brackets 45 and 47 formed with alined vertical bores 48 offset to the right from the bar. Herein, both the brackets and the fixed jaw are integral with the bar.

Journaled in bearings 49 fixed in the bores 48 is a shaft 50 which projects both above and below the two brackets with the movable jaw 28 telescoped onto the upper projecting portion and extending laterally to the left from the shaft at the level of the fixed jaw 29. Herein, the movable jaw is an inflexible bar integral at one end with a block 51 of rectangular cross-section having a vertical center bore 52 (FIGS. 1 and 3) telescoping with the shaft. A pin 53 pressed into registering holes in the block and the shaft secures the jaw non-rotatably to the shaft. Thus, the shaft forms the pivot for the movable jaw, and back and forth rotation of the shaft opens and closes the clamp 10.

The adjacent side faces of the two jaws 28 and 29 are flat and vertically disposed and adapted to move into opposed face-to-face contacting relation. To guide bags in between the jaws when the clamp is open, the outer end portions of the clamping faces are chamfered and inclined away from each other at 54 (FIG. 1) to form a relatively wide mouth even when the jaws are nearly closed.

In this instance, the operator 32 is a lever arm having a bore adjacent one end for telescoping loosely over the end portion of the pivot shaft 50 below the lower bracket 47, and the follower 40 is a roller journaled on the free end of the operator arm to rotate about a vertical axis as it rolls on the cam track 39. To secure the operator arm to the pivot shaft in a fixed but readily adjustable relation with the movable jaw 28, the arm is split from the bore to the adjacent end and a screw 55 is projected through one of the legs formed by the split and threaded into the other to clamp the pivot shaft releasably in the bore.

When the pivot shaft 50 is loosely received in the bore, the operator arm 32 is free to swing into any selected angular position relative to the movable jaw 28. Accordingly, the clamping point of each clamp is individually adjustable for precise correlation of the action of the operator with the motion of the accelerated bags 11 and the motion of the clamp 10 along the conveyor 12.

Each clamp 10 is closed by a helical spring 57 coiled loosely around the pivot shaft 50 between the two brackets 45 and 47 acting between the carrier 30 and the shaft to turn the shaft in a direction to press the movable jaw 28 against the fixed jaw 29. While a single helical coil is sufficient to close the clamp, the spring preferably comprises two oppositely wound coils 58 and 59 (see FIG. 5) joined together by a loop 60 approximately at the midpoint of the spring. The spring is telescoped onto the pivot shaft 50 and positioned with the adjacent end turns of the coils straddling a hole drilled in the shaft and with the free ends of the spring wire bent around the carrier bar 44 and anchored in a recess 61 (FIG. 3) in the inner side of the bar. A pin 62 pressed into the hole in the shaft and extending outwardly within the loop 60 forms a projection engageable with the loop to anchor the loop to the pivot shaft 50 as the latter is turned in a direction to wind up and stress the spring. The spring is prestressed during assembly to press the movable jaw 28 against the fixed jaw 29 and develop substantial clamping pressure when the clamp is closed. Although the movable jaw is urged yieldably against the fixed jaw, the available spring force and inflexible jaws coact to provide positive gripping of the bags 11.

With the foregoing arrangement, the spring 57 may be preloaded to obtain any desired pressure and the stresses in the spring are divided between the two coils 58, 59. Moreover, a break in the spring wire anywhere other than at the pin 62 leaves one of the coils effective to close the clamp.

From the foregoing, it will be seen that the improved clamps 10 are quickly and easily adjustable to control the clamping point of the jaws 28, 29 and the movable jaws 28 are immediately and directly responsive to movement of the operators 32. In addition, the clamps are of rugged and trouble-free construction. Thus, the machine may be run at high speed without losses of bags 11 at the transfer station due to improper timing of the closing of the clamps.

I claim as my invention:

1. For use in a packaging machine, a bag clamp comprising a carrier, a shaft journaled on said carrier, a movable clamp jaw fast on and projecting laterally from said shaft, a fixed clamp jaw on said carrier in opposed relation with said movable jaw, the latter being swingable toward and away from said fixed jaw during back and forth rotation of said shaft to close and open the clamp, a wire spring coiled around said shaft and having two oppositely wound portions joined together by a U-shaped loop, the opposite ends of said spring being anchored on said carrier, a projection on said shaft disposed within said loop and engaging the latter, said spring being stressed between said projection and said carrier to rotate said shaft relative to the carrier in a direction to press said movable jaw tightly against said fixed jaw, an operator arm fast on said shaft in a predetermined angular relation with said movable jaw and movable in one direction about the shaft axis to turn the shaft in opposition to said spring to open the clamp and increase the loading of the spring thereby conditioning the clamp for closing upon release of the shaft to the action of the spring, and means for releasably securing said arm in different fixed positions relative to said shaft for precise selection of the angular relation between the arm and said movable jaw.

2. For use in a packaging machine, a bag clamp comprising a carrier, a rotatable shaft journaled on said carrier, a movable clamp jaw fast on and projecting laterally from said shaft, a fixed clamp jaw on said carrier in opposed relation with said movable jaw, the latter being swingable toward and away from said fixed jaw during back and forth rotation of said shaft to close and open the clamp, a spring wound helically around said shaft with its opposite ends secured to the shaft and the carrier respectively, said spring being stressed to rotate said shaft in a direction to press said movable jaw tightly against said fixed jaw, and an operator secured at one end to said shaft and projecting laterally therefrom in a predetermined angular relation with said movable jaw, said operator being movable in one direction to turn said shaft in opposition to the force of said spring to open the clamp and condition the same for closing upon reverse movement of the operator, and also being angularly adjustable about said shaft for precise selection of said predetermined angular relation.

3. A clamp as defined in claim 2 further including a support for said clamp, a second shaft journaled on said support and fast on said carrier thereby pivotally mounting said carrier on said support, and a second operator fast on and projecting laterally from said second shaft in a predetermined angular relation therewith whereby movement of said second operator rocks said clamp relative to said support.

References Cited by the Examiner

UNITED STATES PATENTS

| 308,537 | 11/1884 | Walsh | 16—188 |
| 2,626,421 | 1/1953 | Lyons | 16—188 |
| 2,942,719 | 6/1960 | Bofinger | 198—33 |

FOREIGN PATENTS 484,735 7/1952 Canada.

ROBERT C. RIORDON, *Primary Examiner.*

R. J. BUENZLE, B. S. MOWRY, *Assistant Examiners.*